Figure 1:
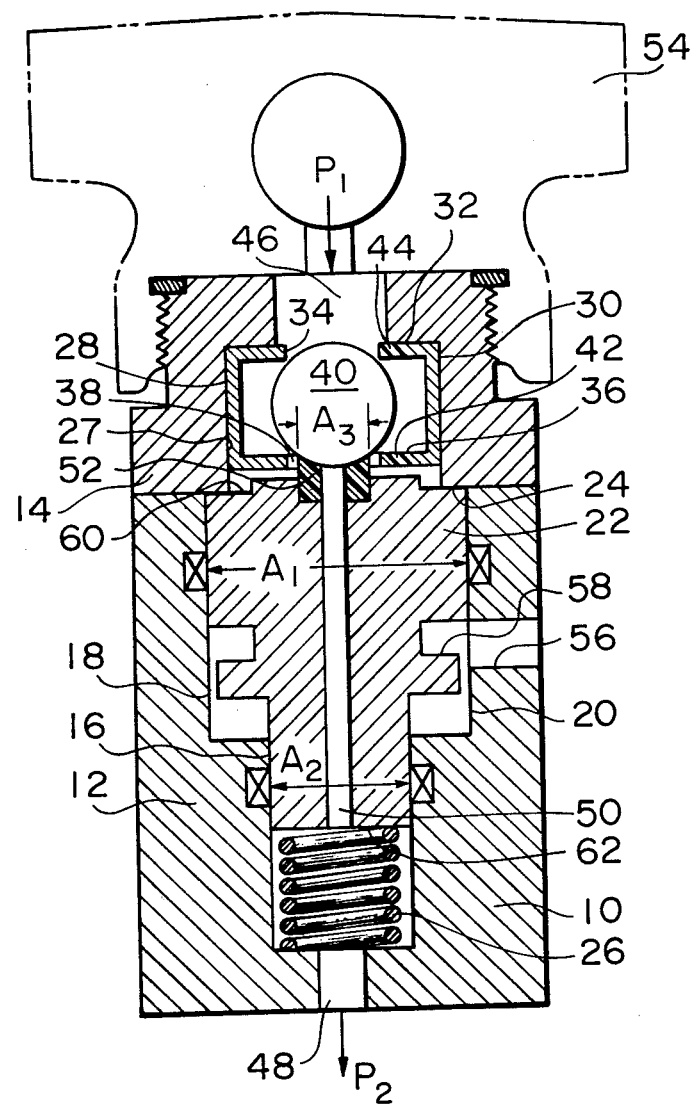

United States Patent [19]
Yabuta et al.

[11] 3,886,966
[45] June 3, 1975

[54] HYDRAULIC PRESSURE CONTROL UNIT

[75] Inventors: Keiichiro Yabuta; Yoshitaka Koike, both of Yokohama, Japan

[73] Assignee: Nissan Motor Company Limited, Yokohama, Japan

[22] Filed: Dec. 17, 1973

[21] Appl. No.: 425,128

[30] Foreign Application Priority Data
Dec. 18, 1972 Japan.............................. 47-12672

[52] U.S. Cl.............................. 137/493.2; 303/6 C
[51] Int. Cl............................................. F16k 45/00
[58] Field of Search............. 137/493, 493.1, 493.2, 137/508; 303/6 C; 188/349

[56] References Cited
UNITED STATES PATENTS
1,177,035   3/1916   Humphrey et al............... 137/493.2

Primary Examiner—Henry T. Klinksiek

[57] ABSTRACT

A unit to supply fluid under pressure from a brake master cylinder to disc brake hydraulic actuators only when the pressure in the master cylinder has exceeded a certain value. This allows the disc brakes and drum brakes actuated from the same master cylinder to engage simultaneously.

3 Claims, 2 Drawing Figures

HYDRAULIC PRESSURE CONTROL UNIT

This invention relates to a hydraulic pressure control unit for use in a hydraulic brake system for a vehicle which has disc brakes on front wheels and drum brakes on rear wheels, and more particularly to a hydraulic pressure control unit for delaying application of brake pressure to hydraulic wheel cylinders of the front disc brakes so that the front disc brakes and the rear drum brakes will engage simultaneously.

Heretofore there have been provided drum brakes for automotive vehicles, but these drum brakes are inferior in anti-fade characteristics to disc brakes, especially when there is a limitation in brake diameter imposed by vehicle design considerations. Thus, there is a growing tendency to fit disc brakes to front wheels and drum brakes to rear wheels to obtain better braking performance from high speeds.

In a vehicle hydraulic brake system using front disc and rear drum brakes, the rear drum brakes, due to the provision of return springs, may engage later than the front disc brakes when the brake pedal is depressed. If such a hydraulic brake system is installed on an automotive vehicle with an automatic transmission, a driver may develop the habit of keeping one foot on the gas pedal and the other foot on the brake pedal when driving at low speed, giving rise to rapid wear of the discs of the front brakes. It is thus desirable to delay application of hydraulic pressure to the disc brakes until the drum brakes are just about to engage, so that the front disc and rear drum brakes will engage together.

It is accordingly an object of the present invention to provide a hydraulic pressure control unit for a hydraulic brake system for a vehicle which has disc brakes on front wheels and drum brakes on rear wheels, which delays application of hydraulic pressure to hydraulic wheel cylinders of the disc brakes until the drum brakes are just about to engage, so that all brakes of the vehicle will engage simultaneously.

Prior art hydraulic pressure control units have thus far been proposed to perform this function, but all of these are provided with a passageway bypassing a pressure responsive normally closed valve to relieve pressure to the disc brakes after closure of the valve upon brake release, and thus are very complicated in construction. Accordingly, it is another object of the present invention to provide a hydraulic pressure control unit which is simple in construction.

Figure 2:
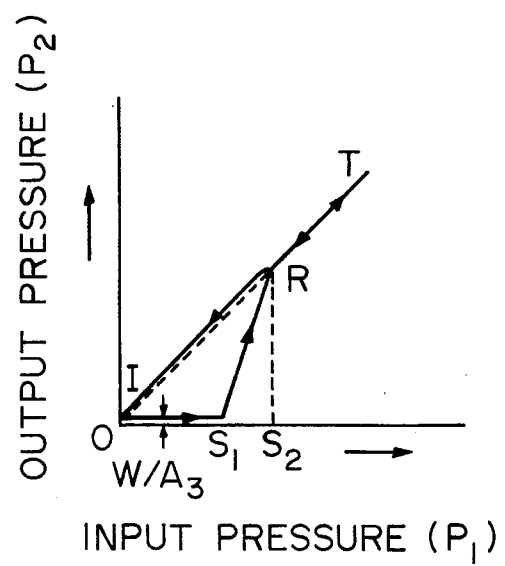

The above and other objects, features and advantages of the present invention will become apparent from the following description taken in connection with the accompanying drawing, wherein:

FIG. 1 is an axial sectional view of a preferred embodiment of a hydraulic pressure control unit of the invention; and FIG. 2 is a graphical representation illustrating the output fluid pressure of the hydraulic pressure control unit of FIG. 1 in response to the input fluid pressure applied thereto.

Referring to FIG. 1, a housing 10 is constructed of complementary housing sections 12 and 14 of which adjacent ends (no numerals) are threaded or otherwise fixed together. The housing 10 is provided with a longitudinal bore 20 which has a large diameter section 18 and a small diameter section 16. A valve spool or differential piston 22 is movable in the bore 20, and is normally urged toward a stop 24 which is formed at the mating end of the housing section 14 by a biasing means such as a compression spring 26 as shown. The piston 22 has a large end 60 and a small end 62 which engages with the spring 26.

The housing section 14 is provided with a longitudinal bore 27 concentric with and of a diameter smaller than the large diameter section 18.

A ball cage 28 is fixed to the inner surface of the bore 27, and is formed of a sleeve 30 integral with an upper collar 32 which has an upper hole 34 therethrough and with a lower collar 36 which has a lower hole 38 therethrough. As illustrated, the sleeve 30 is of a diameter greater than that of a valve element or ball 40 received therein, providing space for fluid flow around the ball 40. The upper and lower holes 34 and 38 are of circular shape with diameters smaller than that of the ball 40. The upper and lower collars 32 and 36 are respectively formed with a plurality of passages, only one of each being shown and designated as 42 and 44. The passage 42 is provided for fluid flow when the ball 40 engages with the lower collar 36 and closes the lower hole 38. The passage 44 is provided in the upper collar 32 for a similar purpose.

The top end of the housing section 14 as shown is formed with an axial inlet 46 communicating with the interior of the ball cage 28 through the hole 34, and the bottom end of the housing section 12 is formed with an outlet 48. The inlet 46 and outlet 48 are communicable through a longitudinally extending axial bore 50 through the piston 22, and a generally annular valve seat 52, attached to a portion of the large end 60 of the piston 22 and surrounding the bore 50. The ball 40 normally engages with the valve seat 52 due to gravity to block communication between the inlet 46 and outlet 48 through the bore 50.

A hydraulic pressure control unit of the invention is mounted in a substantially vertical position with the inlet 46 upward, so that the ball 40 will normally engage with the valve seat 52. The housing section 14 is reduced at its top end and threaded for connection with a source of fluid under pressure such as the housing of a master cylinder 54. However, if desired, the unit can be remotely positioned with respect to the master cylinder 54, as is well known in the art. The outlet 48 is connected to hydraulic actuators or cylinders of disc brakes on the front wheels of the vehicle (not shown).

Since a hydraulic pressure control unit of the invention is a so-called "normally closed valve," it is necessary to urge the piston 22 downward against the force of the spring 26 to retract the valve seat 52 from the ball 40 to provide communication between the inlet 46 and outlet 48 to perform a bleeding operation. This can be done with a tool, such as a screwdriver, by inserting it through a hole 56 formed through the housing section 12 and pressing downward on a radial land 58 formed on the piston 22.

In a normal disengaged condition of the brakes, the components of the control unit assume the positions shown in FIG. 1, with the ball 40 resting in the valve seat 52 under the influence of gravity, and the differential piston 22 urged into engagement with the stop 24 by the spring 26.

When, in operation, the master cylinder 54 is actuated for the purpose of engaging the brakes, fluid under pressure is applied through the inlet 46 into the ball cage 28, and passes through the passage 42 to impinge on the face of the large end 60 of the piston 22. At this point, the piston 22 is in a first position in which fluid communication between the inlet 46 and outlet 48 is blocked by the ball 40, and the ball 40 is in a position corresponding to the first position of the piston 22 because it is in engagement with the valve seat 52. Until the pressure of the fluid reaches a predetermined value $S_1$, however, the unit will remain in the position shown due to the force of the spring 26. It will be noted that the pressure of the fluid also acts on the ball 40 to press it tightly against the valve seat 52. When, however, the pressure of the fluid has increased beyond the predetermined level $S_1$ which is sufficient to overcome the force of the spring 26, the piston 22, attached valve seat 52 and ball 40 will begin to move downward as shown in FIG. 1. When the piston 22 has reached a second position, the ball 40 will engage with the collar 36 which acts as a mechanical stopper. Subsequently, the piston 22 will continue to move downward somewhat, but the ball 40 will be prevented from further movement by the collar 36 and thus disengage from the valve seat 52. This will allow fluid to flow to the outlet 48 from the inlet 46 through the bore 50.

When the master cylinder 54 is de-actuated to release the brakes, reduction of pressure in the cylinder 54 will initiate reverse fluid flow from the outlet 48 to the inlet 46 through the bore 50. The piston 22 will be moved to its first position by the spring 26, and fluid flow will not be prevented by the ball 40 because it will be lifted from the valve seat 52 by dynamic fluid force. The ball 40 will abut against the collar 32, and fluid will flow to the inlet 46 through the passage 44.

Regarding the pressures in the control unit shown in FIG. 1 and described hereinabove, fluid from the master cylinder 54 at a pressure $P_1$ is applied through the inlet 46. The input fluid at the pressure $P_1$ flows from the inlet 46 into the bore section 18 acting on the differential area $A_1$-$A_3$ of the large and small ends 60 and 62 of the piston 22 with a force $P_1(A_1-A_3)$. $A_1$ and $A_2$ are respectively the areas of the large and small ends 60 and 62 of the piston 22. The pressure $P_1$ acts also on the ball 40 to establish a downwardly directed force $P_1A_3$, because of the area $A_3$ of the ball 40 engaged with the valve seat 52. It should be noted that the force $P_1A_3$ and the weight W of ball cause the ball 40 to engage with the valve seat 52. Thus, the differential piston 22 is urged downward by a force $P_1A_1 + W$ against a force F of the spring 26.

Increase in the input fluid pressure $P_1$ above the predetermined value $S_1$ and subsequent rise of the force $P_1A_1$ above the opposing force F of the spring 26 causes the differential piston 22 to move downward slightly to separate the valve seat 52 from the ball 40 to allow fluid flow through the bore 50, because the ball 40 is held by the lower collar 36. Fluid then begins to flow through the longitudinal bore 50 to the outlet 48 to provide an output fluid pressure $P_2$ which acts on an area $A_2$ of the small end 62 of the differential piston 22 to establish a force $P_2A_2$ in opposition to the force $P_1A_1$. Thus, the output fluid pressure $P_2$ increases as illustrated by the line $IS_1R$ in FIG. 2. The line $S_1R$ can be expressed by the following equations:

$$P_1A_1 = P_2A_2 + F \quad (1)$$

Hence, $$P_2 = \frac{A_1}{A_2}P_1 - \frac{F}{A_2} \quad (2)$$

When the input fluid pressure $P_1$ increases beyond a value $S_2$, the valve seat 52 is completely separated from the ball 40. The output fluid pressure $P_2$ then becomes equal in magnitude to that of the input fluid pressure $P_1$, and increases as illustrated by the line RT in FIG. 2.

Upon release of the brakes, the pressure $P_2$ decreases with decrease of the pressure $P_1$ as long as the pressure $P_1$ is above $S_2$, as illustrated by the line TR in the FIG. 2.

When the pressure $P_1$ decreases below $S_2$, the valve seat 52 and the ball 40 approach each other. The pressure $P_2$ acts on the effective area $A_3$ of the ball 40 to establish a force $P_2A_3$ which is opposed to the force $P_1A_3 + W$ acting downwardly on the ball 40. Thus, the pressure $P_2$ decreases as the pressure $P_1$ decreases below $S_2$ as illustrated by the line RI in the graph. The line RI can be expressed by the following equation:

$$P_2 = P_1 + \frac{W}{A_3} \quad (3)$$

When the input fluid pressure $P_1$ drops to zero, the output fluid pressure $P_2$ can be determined from equation (3) as follows:

$$P_2 = \frac{W}{A_3} \quad (4)$$

From equation (4), it is obvious that it is preferable to increase the area $A_3$ and decrease the weight W of the ball 40, to reduce the pressure $P_2$, at $P_1 = O$, to an acceptable magnitude.

As seen in FIG. 2, the output fluid pressure increases as illustrated by the line $IS_1RT$ upon application of the brakes, and decreases as illustrated by the line TRI upon release of the brakes.

What is claimed is:

1. A hydraulic pressure control unit adapted to be connected between a source of fluid under pressure and a hydraulic actuator, comprising:

a housing having an inlet for connecting to the source and an outlet for connection to the actuator;

a valve spool movable within a longitudinal bore in said housing between a first position at which fluid communication between the inlet and the outlet is blocked, and a second position at which fluid communication between the inlet and outlet is allowed;

said valve spool defining therethrough an axial bore and having a large end thereof communicating with the inlet and a small end thereof communicating with the outlet;

a valve seat fixed to a portion of said large end of said valve spool and surrounding said axial bore;

biasing means to urge said valve spool toward said first position; and a valve element adapted to engage with said valve seat and thereby block fluid communication between the inlet and the outlet through said axial bore unless said valve spool has been moved from said first position to said second position;

fluid from the source being able to move said valve spool from said first to said second position and thereby flow through said axial bore to the outlet only if its pressure is above a predetermined value.

2. A control unit as claimed in claim 1, in which said valve element is a ball, and which further comprises a mechanical stopper to prevent movement of said ball beyond a position corresponding to said second position of said valve spool when said ball is in engagement with said valve seat.

3. A control unit as claimed in claim 2, in which said biasing means is a compression spring.

* * * * *